US009307850B2

(12) United States Patent
Azad

(10) Patent No.: US 9,307,850 B2
(45) Date of Patent: Apr. 12, 2016

(54) APPARATUS FOR HANGING AN ARTICLE

(71) Applicant: Morris Azad, Beverly Hills, CA (US)

(72) Inventor: Morris Azad, Beverly Hills, CA (US)

( * ) Notice: Subject to any disclaimer, the term of this patent is extended or adjusted under 35 U.S.C. 154(b) by 27 days.

(21) Appl. No.: 14/468,225

(22) Filed: Aug. 25, 2014

(65) Prior Publication Data

US 2014/0361139 A1    Dec. 11, 2014

Related U.S. Application Data

(62) Division of application No. 13/732,530, filed on Jan. 2, 2013, now Pat. No. 8,814,105.

(51) Int. Cl.
*A47G 1/16* (2006.01)
*F16L 3/11* (2006.01)
*F16L 3/133* (2006.01)

(52) U.S. Cl.
CPC ........ *A47G 1/16* (2013.01); *A47G 1/164* (2013.01); *F16L 3/11* (2013.01); *F16L 3/133* (2013.01)

(58) Field of Classification Search
CPC .............. F16L 3/11; F16L 3/12; F16L 3/133; A47G 1/16; A47G 1/164; A47G 1/666
USPC ........ 248/58, 59, 62, 63, 74.3, 477, 489, 495, 248/496, 317, 476, 498; 24/16 PB, 11, 593, 24/593.11
See application file for complete search history.

(56) References Cited

U.S. PATENT DOCUMENTS

| 3,991,444 | A | 11/1976 | Bailey |
| 4,009,509 | A | 3/1977 | McCormick |
| 4,557,455 | A | * 12/1985 | Benjamin ..................... 248/496 |
| 4,708,306 | A | 11/1987 | Mitomi |
| 4,892,284 | A | 1/1990 | Kelrick |
| 5,221,064 | A | * 6/1993 | Hodges ........................... 248/59 |
| 5,377,510 | A | 1/1995 | Smith |
| 5,517,728 | A | 5/1996 | Woods |
| 5,687,455 | A | 11/1997 | Alexander |
| 5,695,147 | A | 12/1997 | Zimmerman |
| 5,740,591 | A | 4/1998 | Hopkins |
| 5,746,401 | A | * 5/1998 | Condon ........................... 248/62 |
| 5,848,771 | A | 12/1998 | Hancock-Bogese |
| 6,185,791 | B1 | 2/2001 | Khokhar |
| 6,299,123 | B1 | 10/2001 | Hayde |
| 6,446,474 | B1 | 9/2002 | Tabacchi |
| 6,527,244 | B1 | 3/2003 | Kamenstein |
| 6,572,067 | B1 | 6/2003 | Kamenstein |
| 6,658,703 | B1 | 12/2003 | Teagno |
| 6,666,425 | B1 | 12/2003 | Ferguson |
| 8,061,054 | B2 | 11/2011 | Rabin |

(Continued)

*Primary Examiner* — Tan Le
(74) *Attorney, Agent, or Firm* — Trojan Law Offices

(57) ABSTRACT

A picture-hanging device for hanging an object such as a picture or mirror that allows a picture to be adjusted vertically after securing the picture-hanging device to a wall. The device has an elongated adjustment member, an adjustable locking head that slideably engages with the elongated adjustment member, and a cable secured to either the elongated adjustment member or the adjustable locking head. The cable secures the picture to a picture-hanging device, and the height of the picture can be adjusted relative to the position of the picture-hanging device even after the picture-hanging device has been secured to a wall. This adjustable picture-hanging device allows the user to fine tune the placement of a picture without having worry about the precise placement of the picture-hanging device, or studs in a wall. The device also prevents unnecessarily drilling new holes in a wall.

17 Claims, 10 Drawing Sheets

(56) References Cited

U.S. PATENT DOCUMENTS

| | | | |
|---|---|---|---|
| 8,356,777 B2 * | 1/2013 | Miles et al. | 248/59 |
| 2007/0187566 A1 | 8/2007 | Price | |
| 2009/0188121 A1 | 7/2009 | Rabin | |
| 2010/0096532 A1 * | 4/2010 | Greve | 248/477 |
| 2011/0072623 A1 | 3/2011 | Vermeer | |

* cited by examiner

APPARATUS FOR HANGING AN ARTICLE

CROSS REFERENCE TO RELATED APPLICATIONS

This application is a divisional (and claims the benefit of priority under 35 U.S.C. §120) of U.S. patent application Ser. No. 13/732,530, filed Jan. 2, 2013, which is incorporated by reference in its entirety.

FIELD OF THE INVENTION

The present invention relates generally to an apparatus useful for hanging articles, and more particularly, to an adjustable and releasable device having a cable, useful for hanging objects such as pictures, mirrors, small cabinets, or the like.

BACKGROUND OF THE INVENTION

Hanging pictures or other items on a wall often requires precise measurements to ensure that a single picture is level, or that two different pictures are aligned with each other. Hanging a picture usually requires that nails, screws or other attachment devices secure the picture to the wall. However, there are problems with the traditional method of hanging pictures. One problem is that when the user wants to place a picture in a precise position on a wall, it may be difficult because the hook(s) on the picture frame do not line up directly with where the nail or screw is located. Additional problems exist when trying to align two different pictures, because hooks on different picture frames are not in the same location on the frame with respect to the top of the picture frame. This presents a problem because merely aligning nails on a wall does not guarantee that the pictures themselves will be aligned with each other. Figuring out where to put a nail or screw into a wall is therefore often times consuming and tedious.

Currently, the standard way to reposition a picture that is not level or at a proper height, is to take the picture off of the wall, then remove the nail or screw from the wall, then place that nail in a different location, re-hang the picture, and determine whether the picture is at the desired height. If the picture is not at the desired height, repeat the process all over again. This process of aligning and leveling pictures through trial error is time consuming, produces unnecessary holes, and reduces wall strength that might ultimately need to be repaired.

Additional problems with hanging pictures in the standard way are related to how large pictures are hung on walls. Large pictures often have multiple hooks on the frame to distribute the weight of the picture; yet, sometimes it is not practical to place nails on a wall adjacent to the frame hooks because if the hooks do not align with wall studs, the nails would have to be inserted into weak portions of the wall without any studding. If the user tries to only place nails into wall studs, the pictures may not be in an aesthetically desired position, or may not be level if the nails are not symmetrically aligned with the framing hooks. The user then has the dilemma of either hanging the picture securely against studs (which may place the picture in an unaesthetic position), or hang the picture exactly where the user wants, but not secured against wall studding.

Another problem is that pictures are susceptible to falling off walls during earthquakes when hung in the traditional manner. This occurs because hooks or wires on a picture frame do not envelop the entire nail or screw on the wall, and therefore the jolt of even a small earthquake can cause the picture to bounce off the nail and fall to the ground. Furthermore, when pictures are secured to a wall by via means where the hooks or wire on a picture frame do not envelop the nail on a wall, the pictures are vulnerable to theft, because the pictures can easily be stolen by merely lifting the picture off a nail or screw.

Some hangers have been designed that attempt to overcome the above mentioned problems. U.S. Pat. No. 5,695,147 to Zimmerman describes an adjustable hanging device that controls the length of a flexible line fixed at both ends for hanging objects by means of a rotatable body that can length or shorten a hanging wire, thereby shifting a picture up or down on a wall. U.S. Pat. No. 6,666,425 to Ferguson describes a vertically-adjustable picture-hanger having a body with a plurality of vertically arranged teeth and an adjustable bracket such that the picture can be placed on any one of the vertically arranged teeth. U.S. Pat. No. 8,061,054 to Rabin describes an adjustable picture-hanging device with an elongated strap and a pair of spaced sliders to enable marking spots on a wall for facilitating leveling of a picture to be mounted. U.S. Pat. No. 6,572,067 to Kamenstein describes an adjustable picture-hanging hook having a gear coupled to a hook that can adjust a picture horizontally or vertically. U.S. Pat. No. 4,892,284 to Kelrick describes an adjustable hanger having a rack and pinion for continuously moving an object horizontally and a treaded screw for continuously moving the object vertically. While these inventions and others allow for adjustment of pictures on a wall, there is a continuing need for improved hanging devices that are inexpensive to manufacture, have a low profile, have anti-theft and earthquake damage prevention features, all while allowing a user to quickly, and accurately adjust the position of a picture with a minimum of difficulty.

SUMMARY OF THE INVENTION

The present invention relates to an adjustable apparatus for hanging an article. While throughout the specification the article is referred to as a picture, and the apparatus is referred to as a picture-hanging device, the apparatus will work on any object equipped with hanging hardware to be hung on walls or off of ceilings, such as mirrors, cabinets, and the like. It is an object of the present invention to provide a picture-hanging device for the easy adjustability of positioning and leveling of a single picture, as well as aligning multiple pictures.

Conventionally, a picture-hanging device can be as simple as a single nail or screw. Once the nail or screw is secured to a wall, the position of the picture hung on that wall is set because the hooks or a wire on the back of the picture frame are pre-set on the frame. It is therefore an object of this invention to be able to adjust the height and/or tilt of a picture frame after the picture-hanging device has already been secured to a wall without using levels, plumbs or drawings lines. In another object of the invention, the wall hanging device allows for a few inches of horizontal and vertical discrepancy so the holes in the wall can be placed closer or further away from each other, thus optimizing their placement based on location of studs, or avoiding electric wires, plumbing, etc. The picture-hanging device can be left in place even when new pictures with differently sized frames are desired, since the picture-hanging device can be adjusted to accommodate a new frame.

To achieve these and other readily apparent objectives, the present invention provides an adjustable picture-hanging device that can first be secured to a wall or ceiling without having to worry about the precise placement the device. The device comprises at least three structures. A first structure is an elongated adjustment member (such as a strap, rack, or cable tie) having an attachment end and an insertion end.

A second structure of the picture-hanging device is an adjustable locking head. The locking head is capable of slidably engaging with the elongated adjustment member when an insertion end of the elongated adjustment member is inserted in an insertional direction through an aperture of the locking head. Within the locking head, there is a locking protrusion (such as a pawl) that is capable of engaging the elongated adjustment member such that the locking head and adjustment member cannot move relative to each other in a withdrawal direction, but can move freely in an insertional direction. Also located within or on the locking head is a releasing member (such as a tab, button, latch, or the like) that a user can employ to preferentially release or engage the protrusion in the locking head from the adjustment member. The adjustable member of the locking head may be automatically engaged, or manually engaged by the user, while the release of the adjustable member from the locking head is a manual release. When the user releases the releasing member (by pressing a tab, button, or the like), the locking head and the adjustment member can move freely in both the insertional and withdrawal direction. When the releasing member is not employed by the user, the locking head and the adjustment member cannot be moved relative to each other at least in a withdrawal direction.

A third structure of the picture-hanging device is a cable that is secured to the locking head (alternatively, the cable can be secured to the adjustment member). The cable connects the picture to the picture-hanging device. When the locking head moves vertically up or down relative to the adjustment member, the cable likewise moves up and down relative to the elongated member. Even though the adjustment member may be fixed to a wall, the cable holding the picture can be moved up and down, thereby raising or lowering a picture, even though the picture-hanging device may already be fixed to the wall.

The configuration of the cable, elongated member, and locking head has the advantage of allowing the user first affix the adjustment member to the wall, and then attach the locking head, cable and picture to the adjustment member. Once the picture-hanging device and picture are connected, the user can adjust the position of the picture by sliding the elongated member along the locking head until the desired position is found. To remove, or readjust the picture, the user can disengage the locking protrusion within the locking head, thereby allowing the locking head, cable, and picture to move in either an insertional or withdrawal direction (i.e. up or down) relative to the fixed adjustment member on the wall. In a one embodiment, the cable is a looped cable where two ends of the cable extend from opposite sides of the locking member. In another embodiment, to secure a picture, the looped cable simply wraps around a wire or hook on a picture frame.

BRIEF DESCRIPTION OF THE DRAWINGS

These and other features and advantages of the present invention will become appreciated, as the same becomes better understood with reference to the specification, claims and drawings herein:

DETAILED DESCRIPTION OF THE INVENTION

Figure 1:
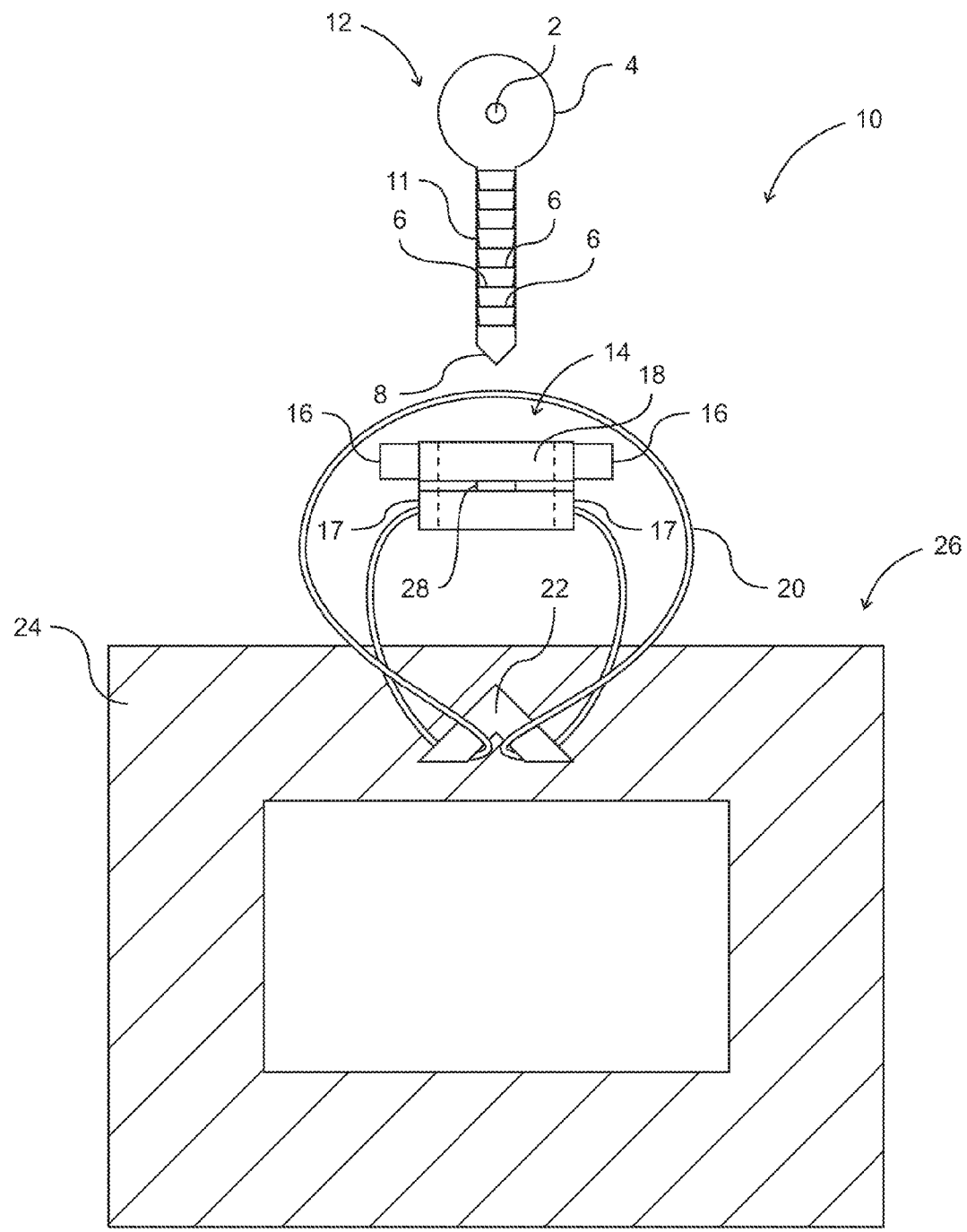
FIG. 1 is a front plan view of a disassembled picture-hanging device having an elongated attachment member, locking head, and cable attached to a picture frame hook.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present there between. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section.

The terminology used herein is for the purpose of describing particular embodiments only and is not intended to be limiting of the invention. As used herein, the singular forms "a," "an," and "the," are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing.

FIG. 1 depicts a disassembled picture-hanging device 10. The picture-hanging device 10 has an elongated adjustment member 12 that inserts within an aperture 18 of a locking head 14. The locking head 14 has a cable 20 that is connected to a hook 22 on a picture frame 24. In this embodiment the adjustment member 12 has an aperture 2 located on an attachment end 4 for placing a nail, hook, or screw into a wall, to fix the adjustment member 12 against a wall. The elongated portion 11 in one embodiment has a plurality of longitudinally spaced plurality of teeth 6 that are capable of engaging with a locking protrusion, such as a protrusion tooth of pawl 28, which resides within the aperture 18 of the locking head 14. (Here, the locking head 14 is shown in transparency, so the protrusion 28 can be seen). In a preferred embodiment, the adjustment member 12 can be inserted in an insertional direction and move down freely relative to the locking head 14. However, the adjustment member 12 is prevented from being withdrawn in a withdrawal direction by engagement of the protrusion 28 with the plurality of teeth 6. The adjustment member 12 can only be withdrawn from the locking head 14 when the protrusion 28 is released from engagement with the teeth 6. This release is accomplished by the user employing (either by pressing, pulling, pushing, or the like) a releasing member(s) 16 which disengages the protrusion 28 from the plurality of teeth 6 on the adjustment member 12. The engagement and disengagement of the adjustment member 12 from the locking head 14 allows the user to move the locking head 14 in fine adjustable increments up or down relative to the adjustment member 12. In one embodiment, the increments, determined by the relative spacing between each of the plurality of teeth 6, are evenly spaced from each other, and preferably each tooth is between 0.2 to 10 mm from each other. In another embodiment, the relative spacing between each of the plurality of teeth 6 are between 0.5 mm and 3.0 mm.

In one embodiment, the cable 20 can be can be in the form of a loop, which extends from opposing sides 17 of the locking head 14. In the looped embodiment shown in FIG. 1, the locking head 14 and looped cable 20 are connected to the hook 22 on a picture frame 24 by using a hitch knot, such as a girth hitch (a hitch to connect two closed structures, such as the type of hitch knot used to attach luggage tags to luggage). To secure the cable 20 to the hook 22 using a girth hitch, first one end of the loop 20 is inserted under the hook 22 (or if there is a wire across the frame, the one end of the loop 20 can be inserted under the wire). Next, the locking head 14 is drawn through the free end of the loop 20 in an over-under manner and pulled taught, thereby securing the locking head 14 to the picture frame 24 via the cable 20 and framing hook 22. Other methods of connecting the cable 20 to the picture 26 include the use of a strap hitch, cow hitch, lark's head hitch or lanyard hitch.

Figure 2:
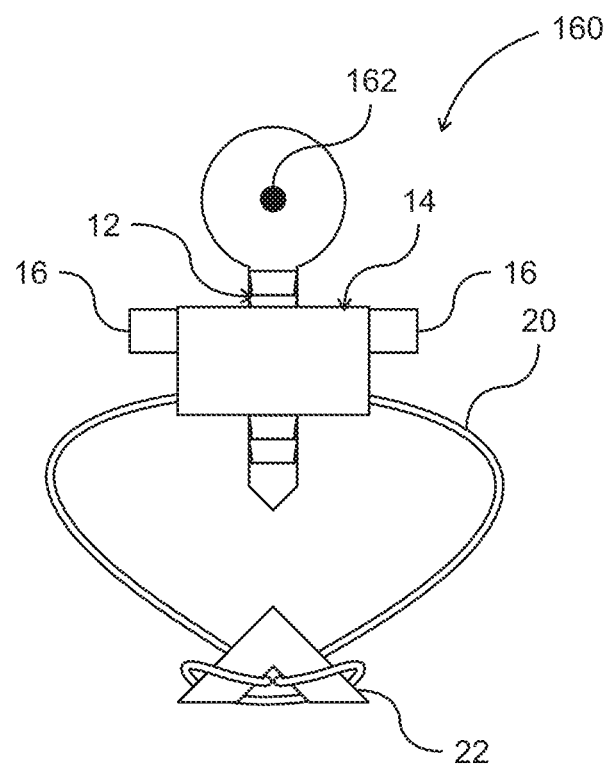
FIG. 2 is front plan view of an assembled picture-hanging device.

There are several advantages over the prior art in this embodiment. One advantage is that when the adjustment member 12 is secured to the wall via a nail or screw 162 (as illustrated in FIG. 2), the distance between the picture frame 24 and the nail 162 can still be varied by moving the adjustment member 12 up or down relative to the locking head 14. The adjustment member 12 and the locking head 14 can move relative to each other when the user employs a releasing member 16 to disengage the protrusion 28 from the plurality of teeth 6 on the adjustment member 12. This is advantageous because unlike the traditional method of hanging a picture (where once a picture is secured to a nail on a wall, the position of the picture cannot be changed without placing the nail in a different location), here, the height of the picture can be adjusted after nailing the adjustment member 12 to the wall.

Another advantage of this device is that nail 162 that fixes the adjustment member 12 to the wall does not need to be placed in a precise location in order for the picture frame 24 to be placed in a specific location at a later time. The user can adjust the relative distance between the screw 162 and picture 26 after the adjustment member 12 has been fixed to the wall. Still another advantage is that the picture-hanging device 10, prevents the picture 26 from falling off the wall during an earthquake. Unlike the traditional method of securing a picture to a wall where a screw 162 directly attaches to the hook 22 of the picture 26, which would allow a picture to be lifted and removed (or pop off a wall during an earthquake), in this embodiment, the cable 20 is secured around the hook 22 and cannot be disengaged from the picture hanging device 10 without either releasing the locking head 14 by employing the releasing member 16, or by reversing the hitch of the looped cable 20.

FIG. 2 depicts an assembled picture-hanging device 160 where the elongated member 12 is secured to a wall by a nail or screw 162. The elongated member 12 is secured within the locking head 14 and can only be released by the user pressing releasing members 16 (here, depicted as side tabs). As in FIG. 1, the locking head 14 is secured to a framing hook 22 (here depicted without the picture 26 or picture frame 24 of FIG. 1), using a girth hitch. In this embodiment, the locking head 14 can move up relative to the elongated member 12 (in an insertional direction), thereby raising the picture. The locking head 14 cannot move down relative to the elongated member (in a withdrawal direction) without the user pressing the side tabs 16, which disengage a protrusion 28 from the plurality of teeth 6, as described and illustrated in greater detail in FIGS. 7-9.

Figure 3:
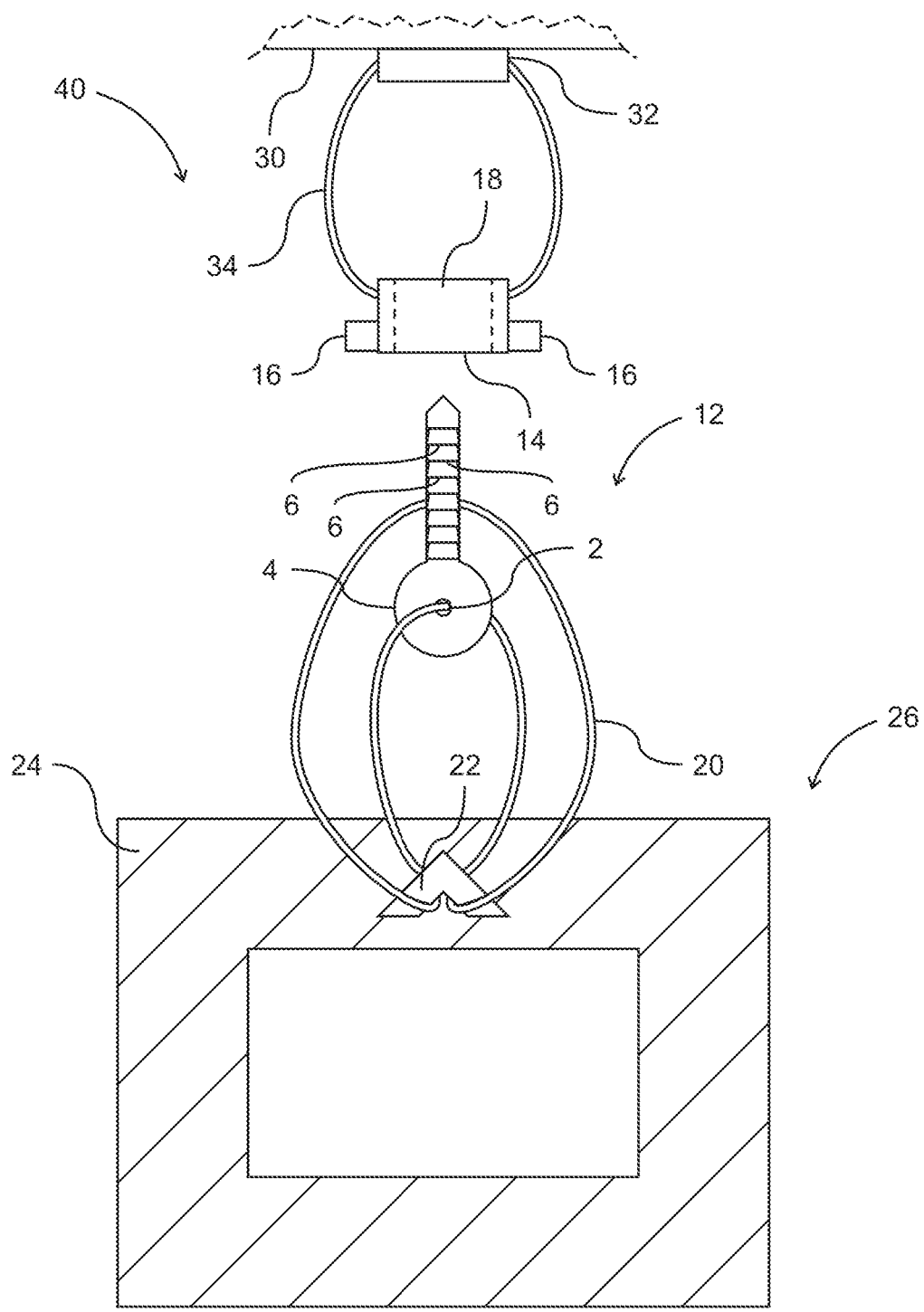
FIG. 3 is a front plan view of an elongated adjustment member attached to a cable and picture frame hook for hanging a picture to a ceiling.

FIG. 3 illustrates another embodiment of a picture-hanging device 40. In this embodiment, instead of attaching the picture 26 to a wall, the picture 26 is attached via ceiling hardware 32 to a ceiling 30. In this embodiment, the locking head 14 hangs from the ceiling hardware 32 via a decorative rope or chain 34 or other attachment device. In an alternative to the embodiments of FIG. 1 and FIG. 2 where the looped cable 20 is attached to the locking head 14, here, the looped cable 20 is attached to the adjustment member 12. Similar to the embodiment of FIG. 1, the looped cable 20 then can secure the picture 26 by using any one of a variety of hitches. The picture 26 may be suspended from the ceiling 30, and adjusted vertically by inserting the adjustment member 12 though an aperture 18 of the locking head 14. The embodiment of FIG. 3 has a protrusion in the locking head 14 that prevents the adjustment member 12 from being withdrawn once the adjustment member 12 has been inserted. The locking head 14 may be adjusted up or down relative to the adjustment member 12 by having the user press a releasing member 16 that disengages the protrusion (such as a pawl) from the adjustment member 12. In other embodiments for a ceiling hanging picture-hanging device, the elongated member 12 may be attached to the ceiling hardware 32 via the decorative rope 24, instead of the locking head 14 (i.e., the positions of locking head 14 and elongated adjustment member 12 are switched). This type of arrangement where the apparatus 40 secured to the ceiling 30 would be advantageous when a picture cannot hang on a wall, such as for use in galleries that wish to have artwork where viewers can see the art from all sides.

Figure 4:
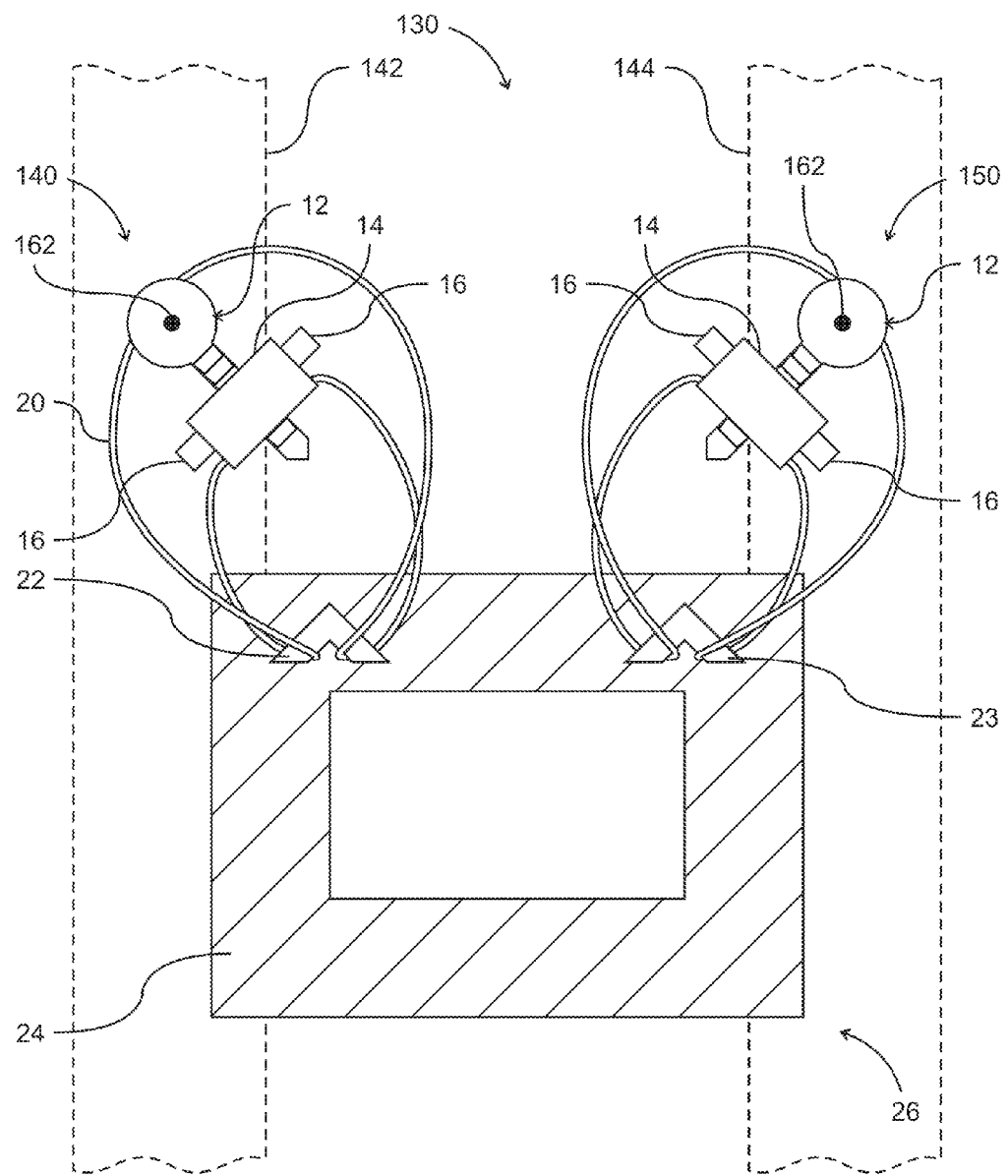
FIG. 4 is a front plan view of two assembled picture-hanging devices hung on studs not aligned with frame hooks.

FIG. 4 depicts an embodiment of two apparatuses 130 for hanging a dual-hooked picture useful for securing a picture 26 to studs 142, 144 that are not aligned with framing hooks 22, 23 on the frame 24 of the picture 26. In this embodiment, there is a first picture-hanging device 140 and a second picture-hanging device 150. The first picture-hanging device 140 is secured to a first stud 142 and the second picture-hanging device 150 is secured to a second stud 144. Here, the studs, 142, 144 are not aligned with the hooks 22, 23 of the picture 26. The advantage of this embodiment is that the two picture hanging devices 140, 150 can be individually tilted and adjusted to have the picture 26 perfectly level even though the nails or screws 162 are not aligned with the hooks 22, 23 on the picture 26. This configuration is especially advantageous for heavy paintings in art galleries, where the paintings need to be mounted to studs 142, 144, and cannot be mounted in direct alignment with the hooks 22, 23. Another advantage is that each attachment device 140, 150 can be individually adjusted so that the picture 26 can be level. Still another advantage of this configuration is that the picture hanging devices 140, 150 can be reused in the same position on the studs 142, 144 for other pictures that may need different alignments. In this situation, when the user needs to replace the painting with another painting (which may require a different height placement) no new holes in a wall would have to be created, since the new painting can use the same picture-hanging devices 140, 150, and these devices can be vertically adjusted by moving the locking head 14 up or down the elongated member 12 as previously described and illustrated in FIGS. 1-4.

A detailed description of the first structure, an elongated adjustment member 12, of the picture-hanging device will now be described. Various embodiments of elongated adjustment members 12 have been described in the prior art. One such type of elongated adjustment member is a cable tie strap, also known as a zip tie. Examples of cable ties include those disclosed in U.S. Pat. No. 3,991,444 to Bailey, U.S. Pat. No. 4,009,509 to McCormick, U.S. Pat. No. 5,517,728 to Woods, U.S. Pat. No. 5,740,591 to Hopkins, and U.S. Pat. No. 6,185,791 to Khokhar, all hereby incorporated by reference in their entirety. Elongated adjustment members may be of a kind that has beaded protrusions along a flexible elongated strip, or a series of ladder and rung-like structures capable of securing a locking head to the elongated adjustment member with a pawl that is insertable between rungs.

Figure 5A:
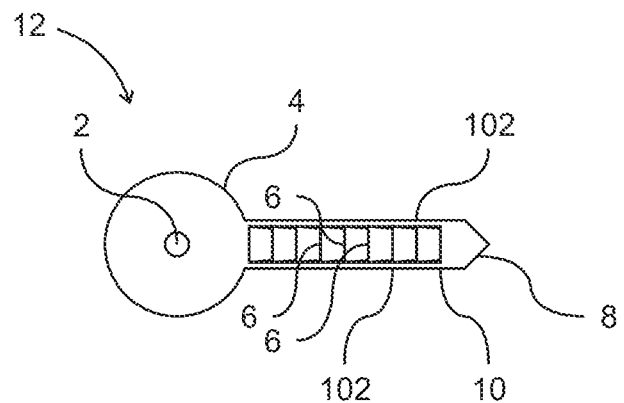
FIG. 5*a* is a front view of an elongated adjustment strap with a plurality teeth.
Figure 5B:
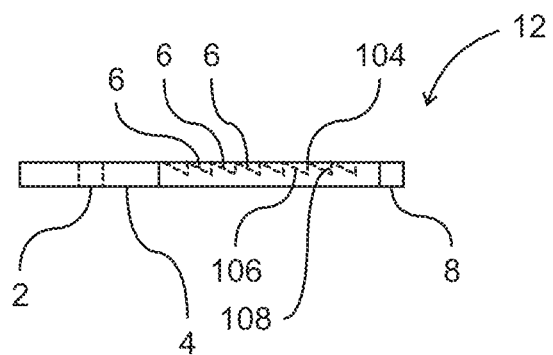
FIG. 5*b* is a cross section view of an elongated adjustment strap with a plurality teeth.

FIGS. 5*a* and 5*b* illustrate an embodiment of a elongated adjustable member that is a cable tie 12. Cable ties, also called zip ties are a type of fastener often used for binding cables or wires together. They are traditional made from nylon, polypropylene, polyvinyl chloride, various plastics, synthetic polymers, metals, or other materials. In one embodiment, a cable tie 12 has an insertion end 8, an attachment end 4, and an aperture 2 for securing the cable tie 12 to a wall by inserting a nail or screw through the aperture to secure the cable tie 12 to the wall. In this embodiment, the cable tie 12 have a plurality of teeth 6 that slope downward in one direction. Here, the plurality of teeth 6 are a linear rack of teeth that are a series of transverse ratchet serrations which lie on a common plan to cooperate and permit passage of the free end 8 of a cable tie 12 through a locking head. The sloping of each tooth 6 allows for movement of the tie 12 in one direction when inserted through a locking head having a protruding tooth (such as a pawl), but not in the reverse direction. Each tooth 6 has a pointed angled top edge 104, a substantially vertical plane 108 forming the height of each tooth 6, and a downward sloping plane 106 that connects the pointed angled top edge 104 of one tooth 6 to the bottom of the substantially vertical plane 108 of an adjacent tooth 6. The angled teeth 6, allow for a protrusion tooth 28 within a locking head (See FIGS. 7-9) to slide through in an insertional direction, but prevents the cable tie 12 from being withdrawn in a reverse direction. A protrusion in the locking head 14 allows movement in an insertional direction but prevents subsequent withdrawal of the cable tie 12 in the opposite withdrawal direction. If a user attempts to withdraw the cable tie 12 from a locking head, back-tension is applied the substantially vertical plane 108 of one or more teeth 6 of the cable tie 12 against the protrusion (such as a pawl, as depicted in FIGS. 7-9) in the locking head 14, which prevents withdrawal of the cable tie 12 from the locking head 14. In this embodiment, the elongated portion 10 of the cable tie 12 has a marginal plain portion 102, which is not serrated. This non-serrated portion allows the cable tie strap 12 to be pulled through the locking head 14 more easily.

Figure 6:
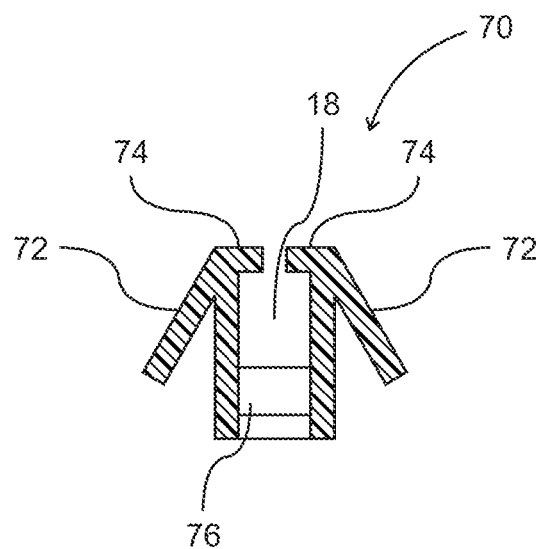
FIG. 6 is a locking head with side pinch release members for locking and releasing an elongated adjustment member.

A detailed description of the second structure of the picture-hanging device, a locking head, will not be described more fully. Several types of locking heads for cable ties have been previously described in the prior, in the U.S. patents describing cable ties referenced above. In one embodiment of a locking head 70, as illustrated in FIG. 6, the locking head 70 has releasing members 72 that are side pinch tabs. When these side tabs 72 are pressed, the aperture 18 within the locking head 70, increase in size by separating the holding tabs 76 which form around a cable tie that is inserted within the aperture 18 of the locking head. By increasing the size of the aperture 18 when pressing the side tabs 72, the user can slide the cable tie 12 (as depicted in FIGS. 1-5) in either an insertion or withdrawal direction because the increased aperture 18 allows the plurality of teeth 6 to be lifted away from the protruding tooth 76, which holds the cable tie in a locked position when the side pinch tabs 72 are not pressed. This type of locking head is advantageous for adjusting the position of a picture on a wall because of the ease of releasing the cable tie 12 from the grip of the locking head 70. Here, while one hand presses the releasing side tabs 72, the other hand can adjust the relative position cable tie 12 (which is attached to a looped cable 20 and a picture 26) to the locking head 70.

Figure 7A:
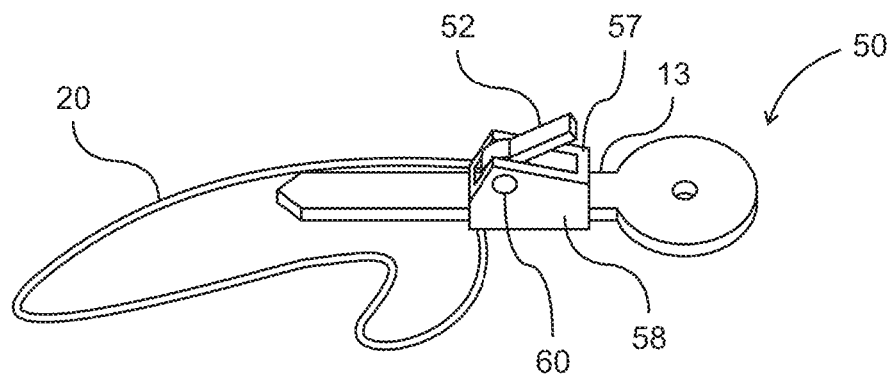
FIG. 7*a* is a perspective view of a locking head with an elongated strap passing through the locking head aperture as found in the prior art.
Figure 7B:
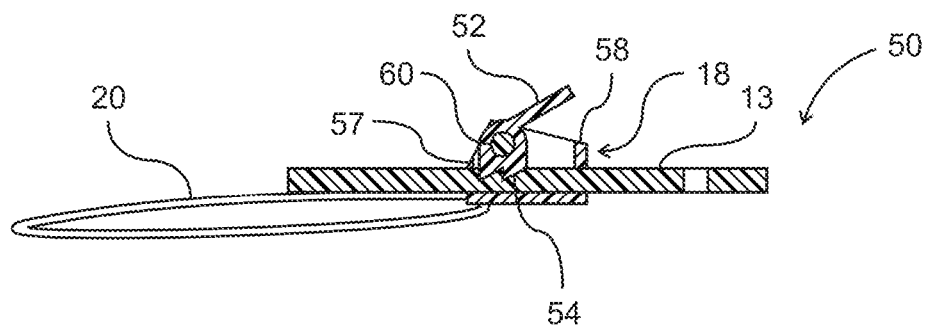
FIG. 7*b* is a side cross sectional view of a locking head with an elongated adjustment member passing through the locking head aperture as found in the prior art.
Figure 7C:
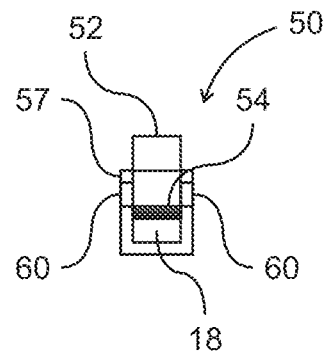
FIG. 7*c* is a front view of a locking head for use with an elongated adjustment member in as found in the prior art.
Figure 8:
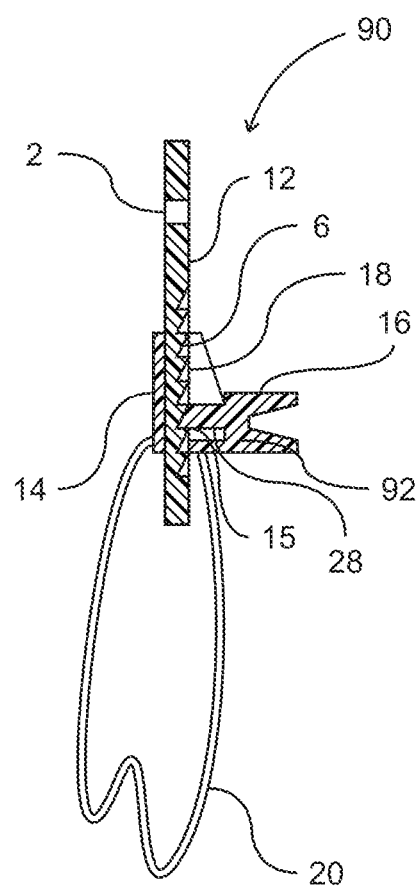
FIG. 8 is a cross sectional view of a locking head with a releasing member, pawl and elongated adjustment member having a plurality of teeth.

FIGS. 7*a-c* depict another embodiment of an elongated adjustment member and locking head with cable 50 that may be used to hang a picture. Here, the elongated strap 13 does not have any transverse ratcheting teeth (such as the teeth in a cable tie), but is easily secured in a locked position by pressure from a protrusion 54 within the locking head 57. U.S. Pat. No. 5,740,591 to Hopkins discloses such an elongated strap and locking head without a looped cable 20 for hanging a picture, and is hereby incorporated by reference in its entirety. FIGS. 7*a-c* depict perspective, cross sectional and front views of this embodiment, respectively. In this embodiment the picture-hanging device 50 has a top releasing member 52, which is attached to the locking head 57 via pivot attachments 60, which as hinges on side walls 58 of the locking head 57. This allows the releasing tab 52 to swivel into a locked position (when the tab 52 is down) and an unlocked position (when the tab 52 is up). Here, the elongated adjustment member 13 is a compressible flexible strap 13. When in the locked position, at least one protrusion 54 on the releasing tab 52 clamps down and presses against the strap 13 (as depicted in FIGS. 7a and 7b), which may be made of rubber, nylon, or other natural or synthetic material. The strap 13 is inserted in an aperture 18 within the locking head 57, and the strap 13 is locked in position the protrusion 54 compressing the strap, thereby locking the strap 13 in place within the locking head 57. In this embodiment, the strap 13 is freely movable in either a withdrawal direction or insertional direction when the protrusions 54 are disengaged from the strap 13 (as depicted in FIG. 7c without the strap 13), but is locked within the locking head when the releasing tab 52 is in its down locked position (as shown in FIGS. 7a and 7b). To hang a picture, the locking head 57 is secured to a looped cable 20. As previously described in FIGS. 1-5 to wrap around a hook (as previously described and illustrated in FIGS. 1-4).

FIG. 8 depicts another embodiment of picture-hanging device 90. In this embodiment the locking head 14 has a center releasing member 16, and an aperture 18 for insertion of an elongated adjustable member 12 (such as a cable tie strap). Within the locking head 14 is a protrusion that is a pawl 28, The pawl 28 has a pawl tip 15, which nestles between the teeth 6 of the elongated adjustable member 12. In this embodiment, the adjustable member 12 cannot be withdrawn from the locking head 14 when the tip 15 of the pawl 28 nestled between the plurality of teeth 6 on adjustable elongated member 12 because of the back-tension of the pawl against the teeth (as previously discussed in reference to FIG. 5). Here, the user can pull the elongated member 12 in an insertional direction with ease because the tip 15 of the protruding tooth 28 of the locking head 14 slides past the teeth 6 of the elongated member 12 because the angle of the tip 15 matches the angle of the teeth 6. As exemplified in FIG. 5b in conjunction with FIG. 8, the top 15 of protrusion 28 within the locking head 14 slides over the downward sloping plane 106, and then nestles with groove between the teeth 6 of the elongated member 12. When the elongated member 12 continues to be pulled in an insertional direction, the protruding tooth 28 can be drawn past the pointed angled top edge 104 of the next tooth 6 of the elongated member 12.

The elongated member 12 is substantially prevented from being pulled back in a withdrawal direction because the protruding tooth 28 presses against substantially vertical plane 108 of each of the plurality of teeth 6 (as described in U.S. Pat. No. 6,185,791 to Khokhar, hereby incorporated by reference in its entirety). The user can slide the elongated member 12 in either the insertional or withdrawal direction when the protruding tooth 28 of the locking head 14 is disengaged from the plurality of teeth 6 when user pressed a the releasing tab 16. By pressing the releasing tab 16 down, the pawl 28 pivots around a pivoting member 92, and raises the tip 15 of the pawl 28 away from the elongated member 12 and out of the grooves of the plurality of teeth 6, thereby allowing the elongated strap 12 to move freely in either an insertional or withdrawal direction relative to the locking head 14. As previously described and illustrated in FIGS. 1-4, when the when a looped cable 20 is attached to the locking head, and the looped cable 20 is secured to a picture 26, the picture 26 can be raised or lowered by moving the elongated strap 12 relative to the locking head 14.

Figure 9A:
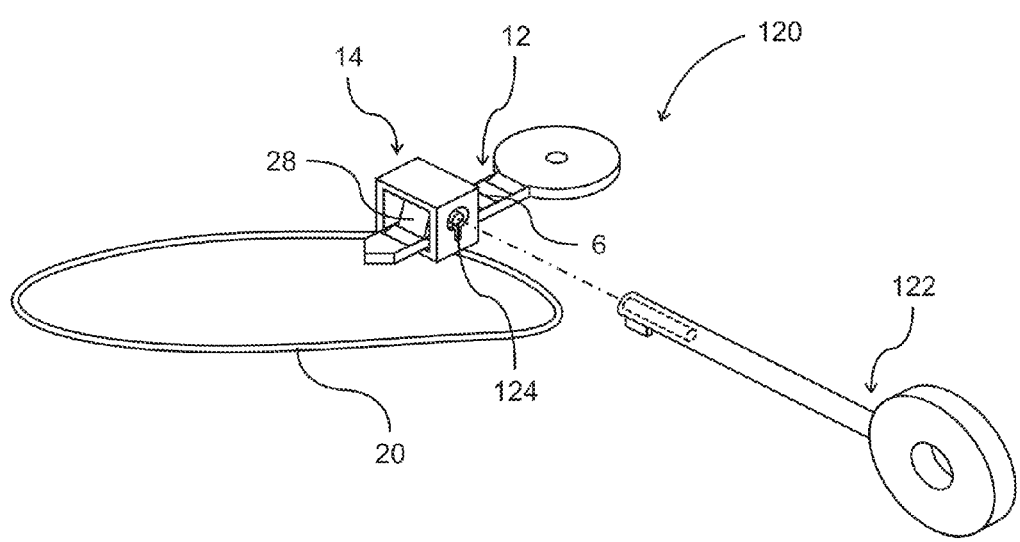
FIG. 9*a* is a perspective view of an assembled elongated adjustable member, looped cable, and locking head having a key release.
Figure 9B:
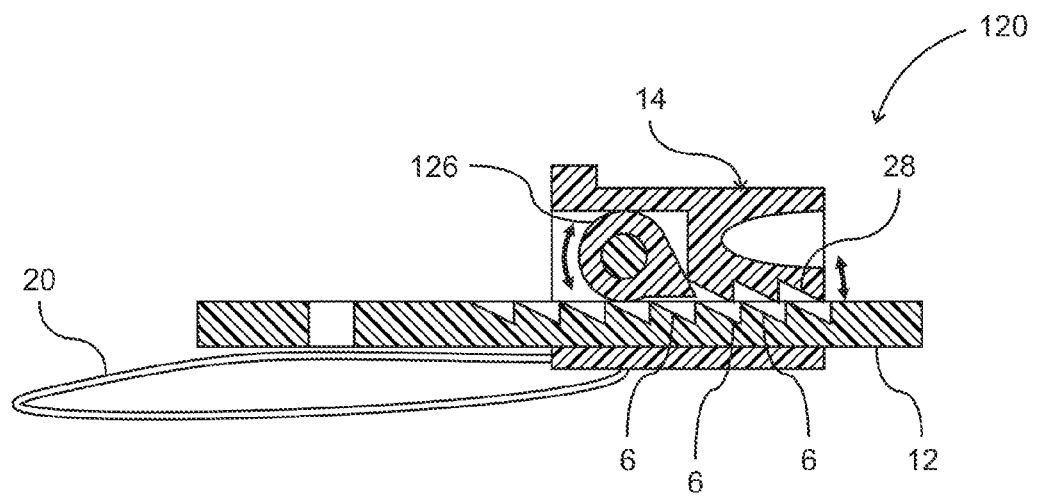
FIG. 9*b* is a cross sectional view of an assembled elongated adjustable member, lopped cable, and locking head, having a key release.

FIGS. 9a and 9b depict an embodiments of a picture-hanging device 120 having a key 122 for locking and releasing an elongated strap 12 to a locking head 14 found in the prior art. Locking heads with insertable keys have been described in the prior art. Examples include U.S. Pat. No. 5,377,510 to Smith, and U.S. Pat. No. 6,446,474 to Tobacchi, both hereby incorporated by reference in their entirety. In FIG. 9a, a key 122 is inserted into a keyhole 124 located on one side of the locking head 14. When the key 122 is rotated, one or more than one protruding teeth 28 are lifted away from the grooves between the plurality of teeth 6 on the elongated member 12 via a pawl-lifting member 126 (as illustrated in FIG. 9b), thereby disengaging the protruding teeth 28 of the locking head 14 from the plurality of teeth 6 on the elongated member 12. Disengagement allows the elongated member 12 to move freely in either an insertional direction or a withdrawal direction. When the key 122 is not turned or inserted, the pawl-lifting member 126 allows the protruding teeth 28 to nestle within the grooves of the plurality of teeth on the elongated member 12. In this embodiment, a picture 26 can be attached to the locking head 14 via a cable 20, as previously described and illustrated in FIG. 1. This embodiment is advantageous for art galleries or other places concerned with theft because the key release makes it difficult for a thief to easily remove a painting from a wall by merely lifting the painting of a wall secured only with a nail or screw, or pressing release tab. Here, in order to remove the painting without a key, the thief would either have to cut the looped cable 20, or elongated member 12 in order to remove the artwork. While this embodiment does not prevent theft entirely, it blocks the casual thief from simply lifting a painting off of a hook, or pressing a release tab to remove a painting.

While the invention has been described in terms of exemplary embodiments, it is to be understood that the words which have been used are words of description and not of limitation. As is understood by persons of ordinary skill in the art, a variety of modifications can be made without departing from the scope of the invention defined by the following claims, which should be given their fullest, fair scope.

I claim:

1. An adjustable picture-hanging device for enabling two-dimensional adjustment of a picture connected to said adjustable picturing-hanging device, the picturing-hanging device comprising:
   a. an elongated adjustment member having an attachment end and an insertion end;
   b. an adjustable locking head, wherein said locking head and said elongated adjustment member are capable of slideably engaging with each other, said locking head having:
      i. an aperture for insertion of said insertion end of said elongated adjustment member,
      ii. a locking protrusion capable of preventing said locking head from moving relative to said elongated adjustment member when said locking protrusion is engaged with said elongated adjustment member,
      iii. a releasing member that disengages said locking protrusion from said elongated adjustment member thereby permitting said locking head to move in an insertional and withdrawal direction relative to said elongated adjustment member;
   c. a cable secured to said elongated adjustment member, whereby said cable connects said picture to said picture-hanging device;
   whereby said picture can be adjusted to a desired height by adjusting the relative position between said elongated adjustment member and said adjustable locking head, notwithstanding a fixed position of said adjustable locking head.

2. The adjustable picture-hanging device of claim 1, further comprising a second cable secured to said adjustable locking head, whereby said second cable secures said adjustable locking head to a structure on a ceiling for hanging a picture.

3. The picture-hanging device of claim 1, wherein said elongated adjustment member comprises a plurality of protrusions.

4. The picture-hanging device of claim 1, wherein said locking protrusion of said locking head is a pawl.

5. The picture-hanging device of claim 4, wherein said plurality of protrusions are a plurality of teeth longitudinally aligned for engaging said locking protrusion of said adjustment head.

6. The picture-hanging device of claim 5, wherein said plurality of teeth are evenly spaced from each other.

7. The picture-hanging device of claim 5, wherein spacing between each tooth of said plurality of teeth is between 0.5 mm and 3.0 mm from each other.

8. The picture-hanging device of claim 1, wherein said elongated adjustment member is a flexible elongated strap.

9. The picture-hanging device of claim 1, wherein said elongated adjustment member comprises an aperture within said attachment end for securing said elongated adjustment member to a wall.

10. The picture-hanging device of claim 1, wherein said cable is a looped flexible cable.

11. The picture-hanging device of claim 1, wherein said elongated adjustment member comprises a linear rack of teeth, whereby said locking protrusion of said locking head engages with said linear rack to prohibit relative movement between said elongated adjustment member and said locking head in a withdrawal direction while permitting relative movement in an insertional direction.

12. The picture-hanging device of claim 1, wherein said locking head comprises a keyhole for insertion of a releasing key, whereby rotating a key within said keyhole allows said elongated adjustment member to move freely in an insertional or withdrawal direction.

13. The picture-hanging device of claim 1, wherein said elongated adjustment member is a beaded flexible strap.

14. The picture-hanging device of claim 1, wherein said elongated adjustment member and said locking head are made from a synthetic polymer.

15. The picture-hanging device of claim 5, wherein said releasing member disengages said pawl from said plurality of teeth when said releasing member is depressed by a user.

16. An adjustable picture-hanging device for enabling two-dimensional adjustment of a picture connected to said adjustable picturing-hanging device, the picturing-hanging device comprising:
   a. an elongated adjustment member having an attachment end and an insertion end;
   b. an adjustable locking head, wherein said locking head and said elongated adjustment member are capable of slideably engaging with each other, said locking head having:
      i. an aperture for insertion of said insertion end of said elongated adjustment member,
      ii. a locking protrusion capable of preventing said locking head from moving relative to said elongated adjustment member when said locking protrusion is engaged with said elongated adjustment member,
      iii. a releasing member that disengages said locking protrusion from said elongated adjustment member thereby permitting said locking head to move in an insertional and withdrawal direction relative to said elongated adjustment member;
   c. a first cable secured to said elongated adjustment member, whereby said cable connects said picture to said picture-hanging device and a second cable secured to said adjustable locking head, whereby said second cable secures said adjustable locking head to a structure on a ceiling for hanging a picture;
   whereby said picture can be adjusted to a desired height by adjusting the relative position between said elongated adjustment member and said adjustable locking head, notwithstanding a fixed position of said adjustable locking head.

17. An adjustable picture-hanging device for enabling two-dimensional adjustment of a picture connected to said adjustable picturing-hanging device, the picturing-hanging device comprising:
   a. an elongated adjustment member having an attachment end and an insertion end;
   b. an adjustable locking head, wherein said locking head and said elongated adjustment member are capable of slideably engaging with each other, said locking head having:
      i. an aperture for insertion of said insertion end of said elongated adjustment member,
      ii. a locking protrusion capable of preventing said locking head from moving relative to said elongated adjustment member when said locking protrusion is engaged with said elongated adjustment member,
      iii. a releasing member that disengages said locking protrusion from said elongated adjustment member thereby permitting said locking head to move in an insertional and withdrawal direction relative to said elongated adjustment member,
      iv. a keyhole for insertion of a releasing key, whereby rotating a key within said keyhole allows said elongated adjustment member to move freely in an insertional or withdrawal direction;
   c. a cable secured to said elongated adjustment member, whereby said cable connects said picture to said picture-hanging device;
   whereby said picture can be adjusted to a desired height by adjusting the relative position between said elongated adjustment member and said adjustable locking head, notwithstanding a fixed position of said adjustable locking head.

\* \* \* \* \*